June 28, 1966 R. R. FOWLER 3,258,646

DIODE EQUIPPED ALTERNATING CURRENT RELAY

Filed Aug. 15, 1962

"PRIOR ART"

"PRIOR ART"

*INVENTOR.*
Ralph R. Fowler

*BY*
C. A. Gulbrandsen
Atty.

United States Patent Office 3,258,646

Patented June 28, 1966

3,258,646
DIODE EQUIPPED ALTERNATING CURRENT RELAY

Ralph R. Fowler, Oak Park, Ill., assignor to Automatic Electric Laboratories, Inc., Northlake, Ill., a corporation of Delaware Filed Aug. 15, 1962, Ser. No. 217,048
3 Claims. (Cl. 317—13)

The invention relates to diode equipped alternating current relays or similar electromagnetic devices, and in particular to the protection of these diodes from high inverse voltages.

Highly reliable semi-conductor diodes are now available that are small in size and well suited for use as rectifiers for alternating current relays. However, these diodes will fail when subjected to high inverse voltages. The duration of an inverse voltage is also a factor affecting diode failure. However, the cost of diodes with high peak inverse voltages ratings makes the use of these devices economically impractical. Also, even diodes with high ratings may fail when subjected to repeated or high transient surges. The transient surges result from, for example, a large magnetic clutch or solenoid connected to the alternating current line.

Therefore, it is the object of this invention to provide an alternating current relay in which the diodes are protected from high inverse voltages, such as resulting from transient surges on the powering line.

Another object of the invention is to minimize the time duration of an inverse voltage across such a diode.

Since semi-conductor devices are sensitive to heat and undergo a resistance derating, it is a further object of the invention to protect these devices from the direct radiation of heat from the relay coil.

The objects and features of the invention will best be understood from the following description of an embodiment of the invention, when taken in conjunction with the accompanying drawings.

Alternating current relays of the type assumed herein, typically have two windings, two diodes, and a laminated core which minimizes eddy current losses. I have found that a resistance bridged between the point of connection of one diode and its corresponding winding and the point of connection of the other diodes and its corresponding winding affords the desired protection from high inverse voltages. This resistance may be of a fixed value or of the non-linear type. The non-linear resistance may advantageously be a varistor.

Figure 2:
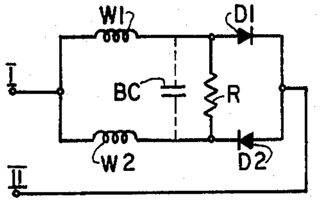
FIG. 2 is a circuit diagram of one embodiment of the invention employing a fixed resistance.
Figure 3:
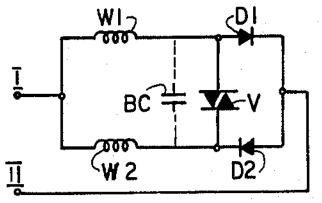
FIG. 3 is a circuit diagram of another embodiment of the invention employing a non-linear resistance.
Figure 3A:
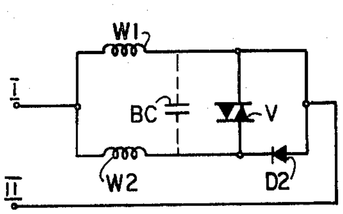
FIG. 3A represents the circuit of FIG. 3 during the conduction state of one of the diodes.

Bifilar winding of the coils of the relay in series opposing increases the inter-conductor capacity of the coils and effectively cancels the winding inductance. That is, a series current will generate opposing and substantially equal magnetic fields. Therefore, when the capacity charges, as would a physical condenser, it can then discharge through the non-inductive impedance of the coil windings and the protective resistance without the delay heretofore caused by inductive windings. This "quick discharge" action decreases the time duration that an inverse voltage is present across a diode. The windings of the coils in FIG. 2, 3 and 3A are wound bifilar.

The invention also relates to protecting the semi-conductor devices from resistance derating effected by direct heat radiation. Protection from direct heat radiation is accomplished by the use of a heat reflecting material between the heat sensitive components and the coils of the electromagnet. The heat reflecting material may advantageously be a heat reflecting tape.

Before entering into a detailed explanation of the operation of my invention, a brief summary of the apparatus used in prior art devices and in the embodiments of my invention shown herein will be given.

Figure 1:
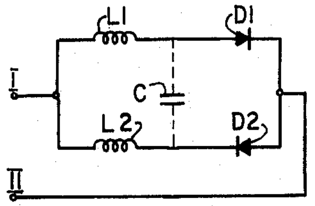
FIG. 1 is a circuit diagram of the prior art relays.
Figure 1A:
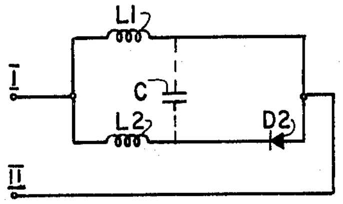
FIG. 1A is a representation of a prior art relay during the conduction state of one of the diodes.

Referring to FIGS. 1 and 1A, the prior art teaches the use of a rectifier, oppositely poled diodes D1 and D2, so that a relay may be operated by alternating current. The windings of such a relay have a certain amount of capacity C, but not of a sufficient amount to offset the effects of the inductance of the windings L1 and L2. Therefore, any charge of the capacity C will be delayed from discharge by the inductance of the windings. The winding capacity C is shown by a broken line.

Referring to FIG. 2, a protective resistance R is bridged across the oppositely poled diodes D1 and D2. The coil windings W1 and W2 are wound bifilar to increase the interconductor capacity BC. Capacity BC is shown by a broken line connection. Winding bifilar results in a series relationship of opposing and substantially equal magnetic fields.

Referring to FIGS. 3 and 3A, the protective resistance of FIG. 2 is replaced by a non-linear resistance V.

Figure 4:
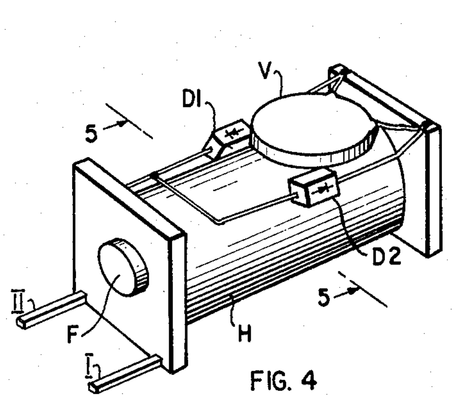
FIG. 4 is a pictorial representation showing the placement of diodes, resistance, and heat reflecting material on the electromagnet of a telephone type relay.

Referring now to FIG. 4, it can be seen that the diodes D1 and D2 as well as the protective non-linear resistance V, are so positioned that the heat reflecting material H is between these components and the electromagnet M.

Figure 5:
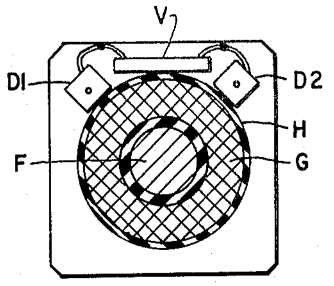
FIG. 5 is a section view of the electromagnet of FIG. 4, taken along the line 5—5.

FIG. 5 is a section view of the electromagnet M, schematically showing the magnetic core F, coils G, heat reflecting material H, diodes D1 and D2 and non-linear resistance V.

The present invention will best be understood by observing the following example of normal relay operation.

Let us assume that a typical diode equipped relay without bifilar and series opposing windings, with circuitry such as shown in FIG. 1, is connected at terminals I and II to a commercial 60 cycle power supply. We will further assume a positive voltage alternation is just starting as the relay switch (not shown) is closed to the power supply, that is the line voltage has passed from negative to zero and is increasing in a positive direction. The positive voltage alternation impresses this voltage on diode D1 through winding L1 causing the diode to conduct. Assume that a conducting diode, for practical purposes, has no voltage drop (FIG. 1A). Current flows through diode D1 and through winding L1 to energize the relay. Diode D2, because of its connection, is non-conducting with this (inverse) line potential applied to its terminal through winding L2. As the magnetic field of winding L1 increases, the magnetic flux produced cuts winding L2 inducing a voltage in that winding. In accordance with known transformer action, this induced voltage adds vectorially with the line voltage to appear as the inverse voltage across diode D2. Diode D2, seen in a non-conducting condition, offers a very high resistance to current flow and, therefore, draws practically no current. Both coil windings are common to line terminal I and diode D2 is connected to terminal II. The vector sum of these two voltages (the line voltage and the induced voltage in winding L2), therefore, appears across the terminals of the non-conducting diode D2. This vector sum will exceed the line voltage for portions of the cycle. In alternating current discussions, voltages and currents are generally referred to in terms of equivalent direct current values or R.M.S. values (root mean square values). These R.M.S. values are very satisfactory for determining power and heating effects. However, a diode is sensitive to instantaneous or peak voltage values, as contrasted to this R.M.S or equivalent direct current value. In a sinusoidal wave pattern, the peak value is 1.41 times the equivalent direct current value or 1.41 times the R.M.S. value. Thus, an alternating current line with 115 volts R.M.S. applied, has peak values 1.41 times this voltage or about 162 volts. This peak line voltage adds vectorially to the peak voltage induced in winding L2. The total vector sum of these peak voltages will give the resultant total peak voltage impressed on diode D2. This sum can approach twice the peak line voltage mentioned above.

Since the coil windings are predominently inductive, the current flowing through the windings will lag the line voltage in time sequence. As the voltage in winding L1 passes its maximum, the current and magnetic flux in the winding starts to decrease. This decrease in current reverses the flux linkage direction in the winding L2. Reversal of flux cutting winding L2 changes the polarity of the induced voltage in that winding. These two voltages now oppose each other. When the voltage induced in winding L2 exceeds the dropping line voltage, the polarity to the diode D2 changes. This reversed polarity sets diode D2 in a conducting state. A current then flows in winding L2 in a direction to maintain the existing field.

The line voltage reverses as the negative voltage alternation is impressed on the terminals I and II. At this time winding L2 is already in a conducting condition from the voltage collapsing field condition described above. Diode D1 now switches to a non-conducting condition, as a result of the removal of terminal voltage from that diode. The line voltage increases and the resultant current through winding L2 builds up the magnetic flux intensity. Winding L1 develops a back electromotive force (E.M.F.) from the rising flux which results from this application of the negative line voltage alternation. The negative voltage alternation passes its maximum and the current and flux again decrease. This change in flux cutting direction reverses the induced E.M.F. in winding L1. When the reversed winding L1 E.M.F. exceeds the line voltage across winding L2, the changed polarity on diode D1 causes that diode to conduct. Current again flows in winding L1 in a direction to sustain the magnetic field, while the line voltage continues to fall and returns to zero.

The positive line voltage alternation now repeats, as given above with the exception that the winding L1 is already in a conducting condition when the line voltage passes through zero to positive and also there is a residual magnetic flux field already set up.

As noted in the above description of operation, the non-conducting diodes may be subject to relatively high peak inverse voltages. If the relay operates on a line circuit with other apparatus which induce line voltage surges, these line surges will add to or subtract from the peak line voltages to increase the possibility of damaging diodes in their non-conducting condition. It is to be understood that diode D1 would be the non-conducting diode and diode D2 would be the conducting diode during the negative portion of the cycle.

Keeping the normal relay operation in mind, surge protection of the diodes is accomplished as follows:

As mentioned above, the preferred embodiment of the invention is that shown in FIG. 3, wherein a bridging element in the form of a non-linear resistance V has been added. This preferred embodiment will be described first.

The non-linear resistance V, which may advantageously be a varistor, is shunted across the non-conducting diode terminals. This provides an ever-ready and instantaneous squelch to any voltage surge regardless of its polarity on the diodes. The non-linear resistance V is substantially non-polarity sensitive. The current flow in a non-linear resistance is a function of its internal resistance. The internal resistance, is dependent upon the applied voltage and the ambient temperature. The internal resistance of the non-linear resistance and the resultant current through this element changes with the applied voltage in accordance with the exponential equation $$I=KE^n$$

Where I is the current flowing through the element, E is the applied voltage, and K and $n$ are physical constants of the material. For example, for a resistance of a fixed value, $n$ is equal to one (1) and K is equal to $1/R$.

Under normal operating voltage conditions, the non-linear resistance draws a small current. This small current through the series coil is sufficient to reduce the normal peak inverse voltage impressed on the diodes, by distributing a portion of this generated voltage within the inactive coil winding.

Assume now that a relay, having circuitry such as shown in FIG. 3, is connected to a commercial alternating current power supply and is operating in the normal manner as previously described. If at this time (consider diode D1 conducting) a surge voltage of the same polarity as the line voltage appears at the line terminals I and II, the inverse voltage will start to build up across the non-conducting diode D2. The non-linear resistance is bridging this non-conducting diode, as shown in FIG. 3A. The increasing voltage at once lowers the resistance of the non-linear resistance, in accordance with the exponential function above. The surge voltage is thus dissipated largely in the series coil winding W2, and only a relatively small portion of the surge voltage appears across the non-conducting diode D2 or the non-linear resistance V.

Let us now assume that a surge voltage is applied in a direction opposite to that of the instantaneous line voltage and in excess of its value. This momentarily (milliseconds or microseconds) will tend to neutralize the magnetic field produced by the line current flowing through the conducting diode D1. This sudden change in flux direction will generate an E.M.F. in an opposite direction in the now non-operating winding W2 and will tend to switch the non-conducting diode D2 to a conducting state when the voltage polarity changes. The resistance of the non-linear element will drop sharply as the potential applied to its terminal rises, causing coil current flow with a resultant voltage drop in the coil windings. The line surge is thus always seen by the diodes as being reflected through the impedance of the coil windings. This voltage is being seen at the same time by the non-linear resistance V. The increased voltage lowers the resistance of the non-linear resistance V, which draws more current as the voltage attempts to rise. The net result is to cause a voltage drop in the coil windings which prevents the damaging surge voltage from appearing across the non-conducting diode. The magnitude of any surge of current is self-limited by the direct current resistance of the coil and its inductance as the shunting effect of the non-linear resistance becomes operative.

FIG. 2 shows an embodiment in which a non-linear resistance is used as a bridging element. Assume that a relay, having circuitry such as shown in FIG. 2, is connected to a commercial alternating current power supply by its terminals I, II. Making the same polarity assumptions as before (D1 conducting) it can be seen that currents and magnetic fields exist, similar to those of the prior art relay. However, there is now a current path through winding W2 via the protective resistance R. As just mentioned, a similar magnetic field exists, except for the small magnetic field set up by the current through winding W2 and resistance R. It can be appreciated that the protective resistance R is always shunting the non-conductive diode. In this manner the protective resistance R effectively isolates the non-conducting diode from the windings. The resistance R in series with the winding W2 forms a voltage divider that is in parallel with the winding W1, similar to V in FIG. 3A. Only the voltage dropped by the resistance R is now across the non-conducting diode D2. It is to be understood that the protective resistance R must be chosen of a value high enough so as not to adversely effect operation of the relay, yet of a low enough value so as to limit the voltage drop across the resistance and thereby across the non-conducting diode.

From the above discussion it can be seen that the inverse voltages resulting from line surges will be proportionally lowered in a similar manner.

As previously stated and referring to FIGS. 2 and 3, the windings W1 and W2 are bifilar and in series opposition. The relatively high interwinding capacity BC will charge as would a physical condenser. Unlike the winding capacity C in the prior art windings L1 and L2, the capacity BC has a non-inductive discharge path through the windings W1 and W2 and also through the protective resistance (R or V). This provides a quick discharge path and decreases the time duration that an inverse voltage is across a non-conducting diode.

As can be seen in FIGS. 4 and 5, a heat reflecting material H is placed between the heat sensitive components and the coils G of the electromagnet protecting the components from direct heat radiation and preventing resistance derating.

While I have described my invention in particular embodiments and by way of example using particular values, modifications can be made by one skilled in the art without departing from the spirit and scope of the invention and should be included in the appended claims.

What I claim is.

1. A relay having a pair of terminals for connecting said relay into an alternating current operating circuit, said relay comprising:

(a) first and second windings;

(b) a first rectifier serially connected to said first winding;

(c) a second rectifier serially connected to said second winding and poled in opposition to said said first rectifier, said two winding-rectifier combinations connected in parallel relation to each other between said terminals; and (d) rectifier protective means connected between the junction of said first winding and said first rectifier and the junction of said second winding and said second rectifier, said protective means effective to lower the inverse voltage across a non-conducting one of said two rectifiers.

2. The combination according to claim 1, wherein said rectifier protective means is a fixed resistance.

3. The combination according to claim 1, wherein rectifier protective means is a symmetrical nonlinear resistance.

References Cited by the Examiner

UNITED STATES PATENTS 2,714,694 8/1955 Drubig et al. ---------- 317—234

STEPHEN W. CAPELLI, *Primary Examiner.*

SAMUEL BERNSTEIN, *Examiner.*

D. YUSKO, *Assistant Examiner.*